Dec. 23, 1958
J. C. KREJCI
2,865,717
FURNACE CARBON BLACK PROCESS AND APPARATUS
Filed May 7, 1956
2 Sheets-Sheet 1
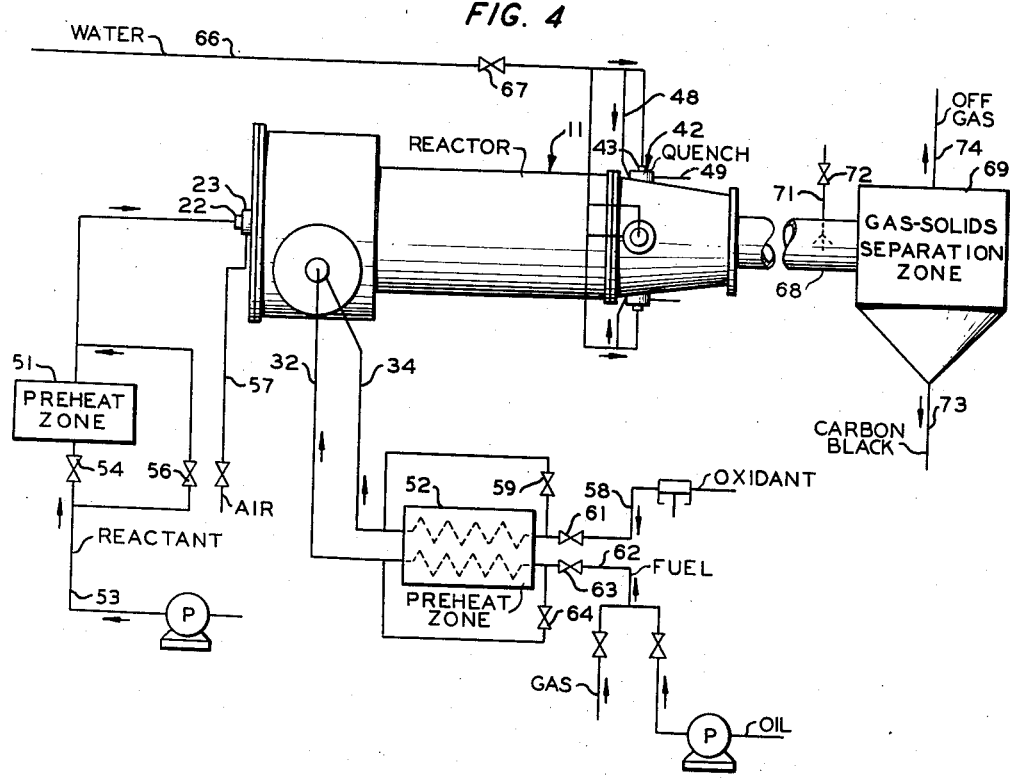
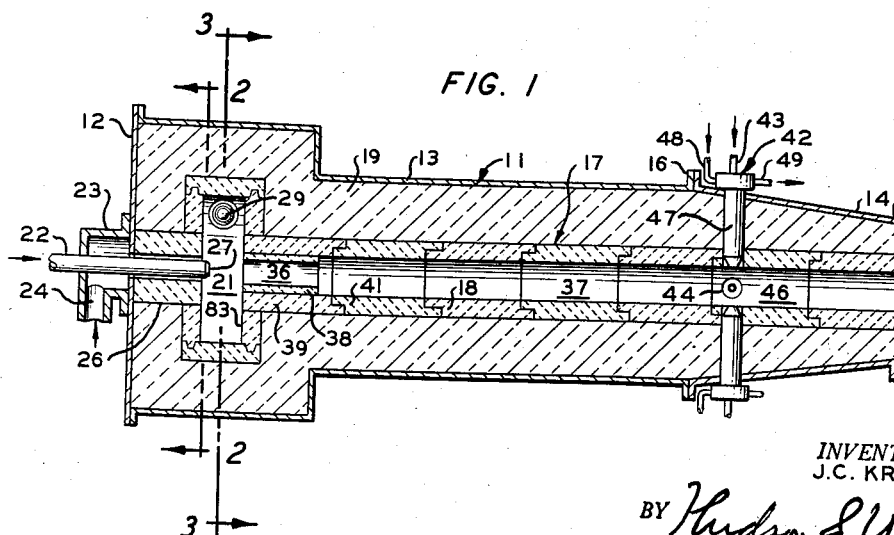
INVENTOR.
J.C. KREJCI
BY Hudson & Young
ATTORNEYS

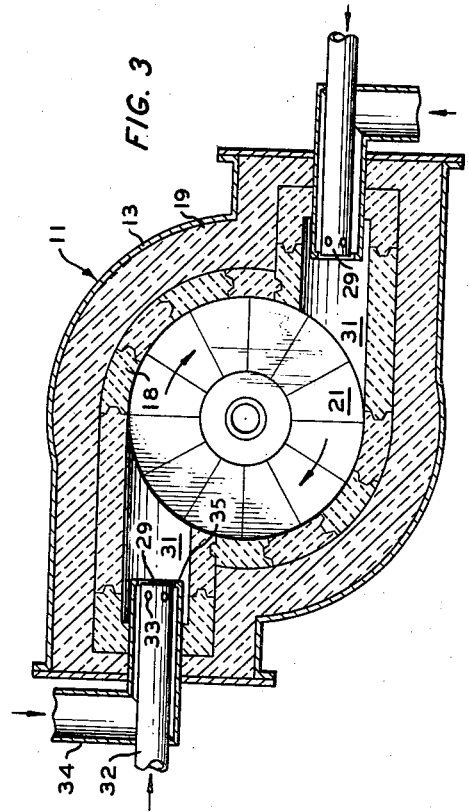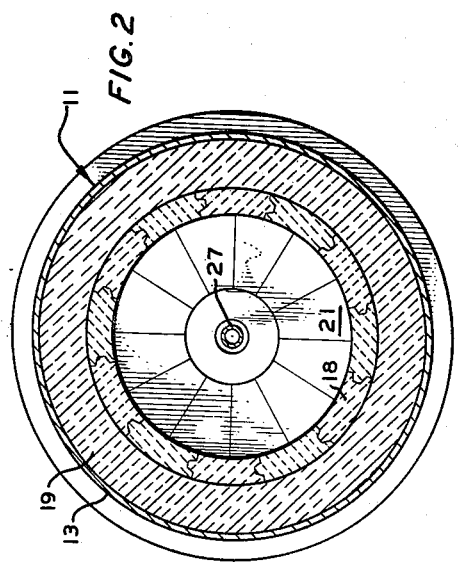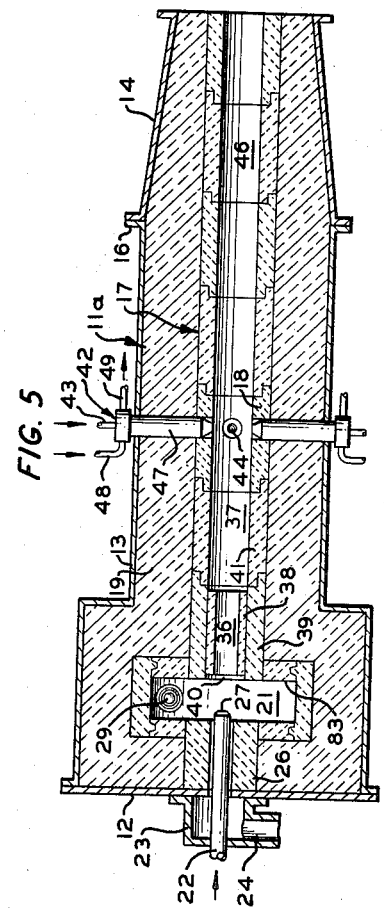

United States Patent Office 2,865,717
Patented Dec. 23, 1958

2,865,717

FURNACE CARBON BLACK PROCESS AND APPARATUS

Joseph C. Krejci, Phillips, Tex., assignor to Phillips Petroleum Company, a corporation of Delaware Application May 7, 1956, Serial No. 583,255

8 Claims. (Cl. 23—209.4)

This invention relates to processes of manufacturing carbon black from hydrocarbons by partial combustion and/or pyrolysis in a carbon black furnace, to carbon black so made, and to carbon black furnaces useful in such processes. In one aspect it has relation to process of making carbon black in which the reactants are passed through a choke, and to furnaces containing such a choke. In another aspect it relates to the relative size and geometry of position of such a choke to obtain a high yield of carbon black in pounds per gallon of hydrocarbon feed, with a decrease in the heat buildup and an increase in the abrasion resistance of rubber mixtures compounded with carbon black from such processes, in a furnace having a large diameter precombustion chamber, a short choke and a smaller diameter reaction chamber.

In the prior art of making carbon black by partial combustion and/or pyrolysis of hydrocarbon in the presence of heated gas or an oxidant, such as a free oxygen containing gas, such as air, with or without an auxiliary fuel, such as natural gas, with or without preheating said reactant and/or oxidant and/or fuel, it has long been the object of difficult research to improve or to maintain either or both of the yield of carbon black obtained from the reactant, and the quality of the carbon black produced. As the chief use for carbon black is incorporating the same in rubber compounds to reinforce the same, and as the major portion of these rubber compounds are employed in automobile tires, among the most important qualities to achieve are reduced heat build up and increased resistance of the final carbon black containing rubber compound to abrasion. To achieve any increase in quality of carbon black at a satisfactory rate of yield at the present stage of the art has become extremely difficult because of the vast amount of prior research and commercial experience in this field, combined with the fact that a large number of variables are involved in the carbon black making process, the result of varying any one or more of which cannot be predicted, but can only be determined after extensive, expensive, and time-consuming tests involving completely rebuilding expensive furnaces, making carbon black in the same under various conditions of feed and air ratios, and then testing the several carbon blacks produced in time-consuming tests in rubber compounds.

For example, in the art of producing carbon blacks that exhibit a high resistance to abrasion, it has heretofore been found that factors resulting in an increase in abrasion resistance have necessarily also resulted in an increase in heat build up and a sharp decrease in yield of carbon black. I have now discovered a process of producing a new carbon black in good rate of yield, which carbon black imparts not only higher abrasion resistance, but lower heat build up to rubber mixtures in which it is incorporated.

A carbon black which imparts to vulcanized rubber good resistance to abrasion along with other desirable properties is said to possess a good reinforcing value or to be highly reinforcing. Carbon black produced as hereinafter described possesses excellent reinforcing value when compounded with butyl or GR–S type synthetic rubber stocks since the abrasion losses and heat build up of such vulcanized rubbers compounded with my carbon lack are relatively low as compared to other high abrasion resistant blacks.

In accordance with the present invention, I provide an improvement in the precombustion process for producing carbon black, said improvement comprising the use of a short choke or orifice at the inlet of the reaction section. Specifically, I have found that certain physical properties, especially abrasion resistance, heat buildup, resilience, and rate of cure, of the carbon black produced in a precombustion type process can be appreciably improved by employing a relatively short cylindrical choke, or orifice, at the inlet of the reaction section of the furnace. The furnace employed in the process of the present invention comprises two cylindrical sections, one short section of large diameter, referred to as the precombustion section, and, an elongated coaxial section of considerably smaller diameter, referred to as the reaction section. I have found that the black produced according to my invention has a higher abrasion resistance and a lower heat buildup, which is a particularly valuable combination of properties, than blacks produced in the same furnace without a choke. In general, the blacks produced by the process of the present invention are higher in surface activity than blacks produced in the same furnace without a choke. The choke, or orifice, is positioned at or near the inlet of the reaction section. While any suitable type of choke or orifice may be utilized in the practice of the present invention, a relatively short cylindrical orifice member, positioned as described above, is the preferred structure.

The present invention consists in the unexpected discovery that by placing a choke of a critical size in a critical position in otherwise conventional carbon black furnaces that the yield in pounds of carbon black per gallon of hydrocarbon feed is substantially maintained, and the abrasion resistance of said carbon black in rubber compounds is substantially increased, while the heat buildup is substantially decreased.

One object of the present invention is to provide an improved process of making carbon black in the furnace by partial combustion and/or pyrolytic conversion of hydrocarbon.

Another object is to produce an improved carbon black product giving lower heat buildup and higher abrasion resistance to rubber compounds into which it is incorporated.

Another object is to provide a new and useful furnace for carrying out said improved carbon black producing process, and making said improved carbon black product.

Numerous other objects and advantages will be apparent to those skilled in the art upon reading the accompanying specification, claims and drawings.

In the drawings:

Figure 1 is a cross sectional elevational view of a carbon black furnace embodying the present invention.

Figure 2 is a cross sectional view of the apparatus shown in Figure 1 taken along the line 2—2 of Figure 1 looking in the direction indicated.

Figure 3 is a cross sectional view of the apparatus of Figure 1 taken along the line 3—3 of Figure 1 looking in the direction indicated.

Figure 4 is an elevational diagrammatic view of a carbon black manufacturing system including the furnace shown in Figures 1 to 3.

Figure 5 is a view similar to Figure 1 of a modified form of furnace embodying the present invention.

In Figure 1 a carbon black furnace generally designated as 11 comprises a refractory-lined heat-insulated body having a generally cylindrical bore. As long as the body is a refractory and heat-insulated, it is of little concern how it is constructed as to details, but in order to teach how to best practice the invention the furnace 11 will now be described in some detail as to the presently preferred construction of the same, it being realized that the invention can be practiced in furnaces of other construction. It is presently preferred to construct the furnace with an outer metal sheath, or cover, comprising several metal pipe and/or plate sections such as 12, 13 and 14 of convenient size secured together in any conventional manner, such as by flanges 16 which may be welded, or bolted (not shown) together. Centrally positioned in said sheath is a refractory tube generally designated as 17 preferably made up of blocks, or pipes, 18 of any suitable ceramic material capable of withstanding the temperatures ranging up to about 2000 to about 4000° F. which may exist in various portions of the furnace. While the entire furnace could be made of the same ceramic material as blocks 18, this would be more expensive than necessary, as considerable money is saved by filling the space between ceramic tube 17 and metal sheath 13 with a suitable castable heat-insulating material 19.

As sheath 13 can be common carbon steel, refractory blocks 18 can be any one of a number of ceramic refractories available on the market such as "Crystalite" (trademark), and heat-insulating material 19 can be any one of a number of heat insulating cements or mortars available on the market such as "Kaocast" or "Alfrax" (trademarks), commonly used in constructing carbon black furnaces, no further description of these materials is necessary.

In the furnace embodying the present invention the heat-insulated body is provided with a generally cylindrical bore, said bore comprising in series a generally cylindrical first chamber 21 having a diameter greater than its length. Chamber 21 is provided with means to introduce hydrocarbon feed generally axially thereof comprising a centrally located axially disposed pipe 22. The furnace could be constructed with pipe 22 coming in through the end wall (not shown) and the process of producing the carbon black, the yield of carbon black, and the quality of carbon black produced would remain substantially the same, but difficulty might be experienced due to overheating and burning of the end of tube 22 and/or the deposition of carbonaceous material thereon due to premature cracking of hydrocarbon therein, to such an extent that the furnace eventually would have to be shut down to clean, repair, or replace tube 22. Therefore, it is preferred to mount tube 22 in an annular pipe elbow 23 through which a relatively minor amount of inert gas, or air is supplied through pipe 24 to form a cooling and insulating annular sheath around the end of pipe 22. When air is employed at 24 the oxygen present therein tends to remove carbonaceous material from the exterior of pipe 22, but the chief function is believed to be that of cooling the end of pipe 22, as a less reactive gas such as hydrogen, carbon dioxide, carbon monoxide, methane, or mixtures thereof will tend to prevent such deposits. In order to provide an annular space for this minor amount of air a ceramic tube 26 is provided, which often is lined with a metal pipe (the metal pipe is not shown as it is not necessary and has little effect on the process, or the carbon black quality, but merely protects the ceramic tube 26 from gradual erosion).

Also, present in the first chamber 21 are means to introduce free oxygen containing gases thereinto generally tangentially to the inner surface thereof, commonly called burners 29, which are best seen in Figure 3.

As Figure 2 merely shows the upstream wall of first chamber 21 further description is believed unnecessary of that figure.

In Figure 3, which is a cross sectional view looking down stream of the furnace, burners 29 are located in burner ports 31 formed and positioned in the body of furnace 11 and preferably lined with ceramic material 18, and disposed and positioned to discharge gases generally tangentially to the inner surface of first chamber 21. A suitable fuel in gaseous form is introduced through central pipe 32, which preferably has a closed end, and this fuel emerges through a plurality of openings 33 to mix with a suitable oxidant, such as air, which is introduced through pipe 34, the mixture preferably passing through restricted orifice 35 and burning in conduit 31 and/or in chamber 21 to supply heat for pyrolysis and cracking of the axially introduced hydrocarbon coming into chamber 21 through pipe 22 of Figure 1. In many commercial operations combustion of said fuel is substantially completed in tunnel conduit 31, and such position of burning is preferred. The fuel entering through pipe 32 is preferably methane, or natural gas, but ethane, propane, butane and normally liquid hydrocarbons in vaporized form may be employed, or liquid hydrocarbons may be forced through pipe 32 and sprayed in through openings 33, although when liquid fuel is employed in pipe 32 it is preferred to close openings 33 and have a pressure spray nozzle on the end of pipe 32 (like nozzle 63 on the end of pipe 26 in Figure 4 of my prior Patent 2,641,534 of June 9, 1953), all with results valuable in the practice of the present invention.

Returning to Figure 1, said first chamber 21 is connected to discharge through a choke 36 into a second generally cylindrical chamber 37 the length of which is greater than its diameter, and the diameter of which is less than ¾ that of said first chamber. The diameter of first chamber 21 being substantially larger than the diameter of said second chamber 37 is particularly useful as both fuel and air are being injected through burners 29 and it is necessary to get ample space for burning the same in first chamber 21, and to minimize impingement on the axial stream from pipe 27. It will be noted that the preferred form of choke 36 is a square shouldered ceramic cylinder 38 lightly cemented with a frangible cement to the inside of pipe 39, and that said first chamber 21, said choke 36, and said second chamber 37 are axially aligned and communicating with each other. While results of some value can be obtained with other shaped chokes, such as Venturi chokes, it is preferred to employ a square shouldered choke in order to get maximum turbulence and mixing in and adjacent said choke 36.

In order to stop the carbon black forming reaction at its optimum point and prevent further reactions of a degenerative nature it is preferred to quench the effluent smoke passing through second chamber 37 at a preselected point by suitable quench means, such as water spray quench means general designated as 42. Any quench means of the prior art may be employed, the one shown having a central water spray supply pipe which discharges the spray through nozzle 44 into second chamber 37 thereby terminating chamber 37 as a reaction chamber at that point so that the conduit 46 downstream of quench 42 is merely a discharge conduit, and water spray 44 is in effect at the downstream end of said second chamber 37. If desired, nozzle 44 may be cooled by the usual water jacket 47 supplied with cooling water entering through pipe 48 and leaving in a heated conduit through pipe 49.

In order to produce the optimum improvement in the carbon black qualities discussed above it is essential to employ a water spray quench, such as 42, however almost as valuable grades of carbon black may be produced without water quenching the same, but merely by cooling fairly rapidly by indirect heat exchange with the atmosphere through the thinner walls of the discharge conduit 68. Without water quench 42, the furnace insulation should terminate into metal pipe 68 or become a very thin lining in pipe 68 at about the place where quench 42 would have been located.

In the practice of the present invention useful results are obtained employing as the axially introduced hydrocarbon in pipe 22 any hydrocarbon gas, such as methane, natural gas, ethane, propane, butane, or mixtures of the same, or any normally liquid hydrocarbon being forced through pipe 22 into chamber 21 in the form of spray, or superheated vapor, but the best results are obtained when the hydrocarbon feed in pipe 22 is at least 80% vapor at 775° F. of an aromatic containing normally liquid gas oil of about 12 or 13 API gravity with an ASTM 90% boiling point of about 775° F. (about 90% evaporated at 775° F.) and a Bureau of Mines Correlation Index of about 80–95. In combination with this axial feed, useful results are obtained by employing as the tangential oxidant entering through pipe 34 air, oxygen enriched air, or air tempered with less reactive gas such as combustion gases, in combination with fuel entering through pipe 32, and employing any of the hydrocarbons enumerated above as suitable for use in pipe 22 in either vaporous form, or as a fine liquid spray, in pipe 32, but the best results are obtained by injecting ordinary air through pipe 34 and ordinary natural gas through pipe 32, said natural gas comprising 80% or more methane, the remainder being chiefly nitrogen, carbon dioxide, ethane, propane and butane.

As shown in Figure 4, furnace or reactor, 11 is connected into a carbon black producing system permitting the various feeds to be modified as described above, and permitting the preheating of all, or any portion, of the reactant in the preheat zone 51, and any portion of the fuel or oxidant in preheat zone 52. Preheat zones 51 and 52 may be any indirect heat exchange heaters, such as a conventional tube heater.

In Figure 4, furnace 11 is the same furnace shown in Figures 1, 2 and 3, or if desired it could be the furnace 11A to be described below with reference to Figure 5. The hydrocarbon reactant introduced axially through pipe 22 is supplied through pipe 53, the amount being controlled by valves 54 and 56. The axial sheath of jacket air entering elbow 23 is supplied from a suitable source 57 in the amount desired, or can be eliminated. The oxidant, generally air, is supplied to pipe 34 from source 58 under pressure, the amount being preheated in 52 being controlled by valves 59 and 61, and the fuel employed in pipe 32 is supplied from source 62, the amount being preheated being controlled by valves 63 and 64.

Water to the water spray quench pipe 43 and to the water jacket cooling pipe 48 of quench 42 is supplied from source 66, or if quench 43 is eliminated, may be cut off by valve 67.

Conduit 68 forms a downstream continuation of discharge conduit 46 and carries the carbon black containing effluent smoke from furnace 11 to any conventional gas-solids separation zone 69, and obviously indirect cooling to the atmosphere occurs in conduits 46 and 68, which may be supplemented if desired, by further spray quenching at 71 in amounts controlled by valve 72. In separation zone 69 the flocculent carbon black 73 is separated from the off gas 74.

Modified furnace 11A shown in Figure 5 is essentially the same as furnace 11 shown in Figures 1 to 3 except that pipe 38 containing choke 36 is positioned 1½ inches downstream of the entrance of pipe 39, leaving an annular shoulder, or rabbet 40 having the same internal diameter as the remainder of the second chamber 37 downstream of choke 36, and the quench 44 has been moved from a position 60 inches downstream of chamber 21 to a position 30 inches downstream of said chamber 21, all in a furnace in which the diameter of chamber 37 was 4 inches.

Whenever normally liquid hydrocarbon is employed as a liquid spray from pipe 22 or pipe 32, the heat in first chamber 21 and tunnels 31 is such that most of the spray is vaporized immediately, so that the result is the introduction of a vaporous, or gaseous, hydrocarbon into the tunnels 31 or chamber 21, and the term "vaporous hydrocarbon" is intended therefore to cover both normal gases, such as methane, and vaporized gas oil, whether vaporized in a preheat zone or sprayed into the chamber 21 and immediately flashed into gas. Furthermore, both preheat and spraying as a liquid with pressure drop through a nozzle into chamber 21 will cause very quick formation of vaporous hydrocarbon. With, or without, preheating, the spraying of liquid hydrocarbon into chamber 21 results in introducing vaporous hydrocarbon into the first zone formed by chamber 21.

EXAMPLES

The following data has been selected as being average and truly representative of the improved results obtained by the use of the choke of the present invention, compared to the results obtained in an otherwise identical furnace not having any choke. Both furnaces had general proportions and equipment corresponding to those shown in Figures 1 or 5, or similar thereto as explained below, said figures being drawn approximately to scale for a furnace with a 4″ diameter reactor section 37. In the control furnace there was no choke, and the second chamber 37 continued cylindrically upstream until it intersected the first chamber 21, the chambers merging with a substantially square shoulder. In one furnace of the present invention a choke was employed as shown in Figure 1 approximately to scale. In another furnace of the present invention a choke was employed as shown in Figure 5 downstream but adjacent the end of chamber 21 leaving a rabbet 40.

It was found that a relatively short choke 36 in second chamber 37 located at or adjacent, the downstream end of chamber 21, was very critical. The length of the choke is very critical in that it should be long enough to cause thorough turbulent mixing of the axial stream from 27 and the tangential stream from 29, but not long enough to cause such an increased pressure drop as would require any substantial reduction in throughput of gases through the furnace. The length of choke 36 to accomplish these results is the same for all diameter reaction chambers 37 and should be between 4.5 and 18 inches long, preferably 9 inches long. Better results are obtained with a square shouldered cylindrical choke pipe 38 than with other shaped chokes. The internal diameter of the choke should be from 40 to 85% of the diameter of the second chamber 37. The choke should be positioned at the end of chamber 21, or within 6 inches thereof, regardless of furnace diameters.

When a quench is employed, the length of the second chamber 37 should be from 12 to 60 inches long, preferably 25 to 35 inches long, more preferably about 30 inches long, in a 4″ diameter reaction section furnace, and from 2 to 6 feet long, preferably 3 to 5 feet long and more preferably about 4 feet long in a 12″ diameter reaction section furnace, and other size furnaces in proportion, for example 25″ long in a 3″ diameter reaction diameter reaction section furnace.

While not as critical as the choke dimensions, it is preferred to have the length of precombustion chamber 21 from ½ to 2 times but preferably about the same as the diameter of the reaction section 37, and the diameter of chamber 21 roughly 3 times the diameter of the reaction chamber 37 or greater. The diameter of the first chamber 21 should exceed its length, and the length of the second chamber 37 should exceed its diameter, and it is very critical that the diameter of the second chamber should be less than ¾ that of the first chamber 21, from ½ to ⅙ the diameter being preferred and ⅓ the diameter being about optimum.

In the furnaces of Tables I to VII the precombustion chamber 21 was 15 inches in diameter and 4.75 inches long, the reaction chamber 37 was 4 inches in diameter and of variable length to the quench 44 as indicated, the choke (when indicated as present) was 9 inches long and 2.5 inches internal diameter, and located at the end of chamber 21 or within 6 inches thereof, as indicated.

In all runs, the same type of at least 80% vaporized normally liquid hydrocarbon oil was injected axially into the furnace through the axial central pipe in the upstream end of the first chamber, surrounded by a sheath of a minor amount of axial air. In order to produce the optimum improvement in the carbon black qualities discussed above it is essential to add axially through pipes 24 from 1 to 10%, preferably about 2 to 7%, of the amount of the tangential air added through pipe 34, however, almost as valuable grades of carbon black may be produced without any axial air. This axial air is employed chiefly to insure that carbon will not deposit at the inlet, especially on the central hydrocarbon pipe, and that said pipe will not overheat. Tangential air and tangential gas (natural gas) was supplied through the two tangential inlets, in the amounts shown, and burned in the furnaces. The carbon black produced in each run was separated by the same conventional separation and tested in the same conventional tests after being compounded in the same amounts in the same rubber stock, all in the same manner.

The identical feedstock of axially introduced oil was used in each of runs 1 to 5, and was a gas oil feedstock No. B201 of 89.3 BMCI (see Table VI for analysis).

Due to the difficulties of control and supply minor variations in amounts of air, oil and gas occurred, and the quality of the oil in some of the other runs varied from a U. S. Bureau of Mines Correlation Index (hereinafter called BMCI) of 82 to 92, but it will be seen by the results in the data that these variations were not large enough to be critical to the successful comparison and evaluation of the process with and without the choke.

Carbon black from each of the runs was separately compounded in a standard rubber mix of 100 parts by weight of the same GRS rubber (GR-S-X-720), 40 parts of the carbon black from the run being tested, 3 parts zinc oxide, 1.75 parts sulfur, 6 parts BRT#7, and 0.8 part Santocure in all tables except Table II where 0.9 part Santocure was used.

BRT#7 is a refined coal tar product, 1.2 to 1.25 specific gravity, of Engler specific viscosity at 100° C. of 6 to 9, used as plasticizer.

Santocure is N-cyclohexyl-2-benzothiazylsulfenamide.

As the tests in the tables are all standard rubber tests made in the standard and conventional way, it is not believed necessary to go into details about them. These tests were made by men skilled in such standard rubber testing.

In Table I, runs Nos. 1 to 3 were with said choke 1½" from the inlet of the reactor section, No. 4 with the choke flush with said inlet, and No. 5 with no choke. Everything else was identical except as noted in the table.

Table II gives rubber tests of carbon black produced in runs Nos. 1 to 5 as identified in the table.

Table I.—Pilot plant operating data

| Run No. | Oil | | Tangential | | Jacket Air Rate, M c.f.h. | Photometer | Pilot Plant Yield, lb./gal. | Grit 325 Mesh, Percent | Nitrogen Surface Area, sq. m./g. | Reaction Section Length, in. |
|---|---|---|---|---|---|---|---|---|---|---|
| | Rate, gal./hr. | Pre-Heat, °F. | Air Rate, M c.f.h. | Gas Rate, M c.f.h. | | | | | | |
| Choke 1½" From Inlet to Reaction Section | | | | | | | | | | |
| 1 | 20.2 | 750 | 18 | 1.2 | 0.54 | 90 | 2.91 | .02 | 147.0 | 30 |
| 2 | 20.2 | 760 | 18 | 1.2 | 0.54 | 90 | 2.84 | .002 | 147.0 | 30 |
| 3 | 20.3 | 760 | 18 | 1.2 | 0.54 | 91 | 2.96 | .01 | 145.4 | 30 |
| Choke at Inlet to Reaction Section | | | | | | | | | | |
| 4 | 20.1 | 760 | 18 | 1.2 | 0.54 | 90 | 2.72 | .04 | 151.8 | 30 |
| Straight Reactor (Control with no choke) | | | | | | | | | | |
| 5 | 28.5 | 760 | 23.04 | 1.56 | 1.4 | 92 | 2.96 | .02 | 140.3 | 60 |

Table II.—Summary of physical properties of carbon blacks of Table I in standard rubber tests (30 Minutes Cure at 307° F.)

| Run No. | Compression Set, percent | 80 F. | | | 200 F. Maximum Tensile, p.s.i. | Δ TF | Resilience, percent | Flex Life, M. | Shore Hardness | Abrasion Loss, g. | Compounded MS 1½ 212 F. | Extrusion at 250 F. | | |
|---|---|---|---|---|---|---|---|---|---|---|---|---|---|---|
| | | 300 percent Modulus, p.s.i. | Tensile, p.s.i. | Elongation, percent | | | | | | | | in./min. | g./min. | Rating |
| Choke 1½" from Inlet to Reaction Section | | | | | | | | | | | | | | |
| 1 | 18.8 | 1,270 | E 3,400 | E 550 | 1,140 | 67.6 | 56.8 | 3.8 | 60 | 6.27 | 38 | 26.3 | 69.3 | 10− |
| 2 | 18.8 | 1,370 | 3,600 | 580 | 1,150 | 66.2 | 56.3 | 4.3 | 58 | 5.82 | 38.5 | 28.3 | 75.3 | 10 |
| 3 | 17.7 | 1,390 | 3,600 | 580 | 1,260 | 65.9 | 55.4 | 3.6 | 58 | 5.61 | 40 | 27.3 | 72.0 | 10 |
| Choke at Inlet to Reaction Section | | | | | | | | | | | | | | |
| 4 | 20.0 | 1,270 | 3,460 | 550 | 1,270 | 66.9 | 55.5 | 5.3 | 58.5 | 6.12 | 39.5 | 25.3 | 66.3 | 10 |
| Straight Reactor Control | | | | | | | | | | | | | | |
| 5 | 19.4 | 1,080 | 3,460 | 590 | 1,200 | 67.2 | 54.6 | 5.1 | 58 | 6.79 | 39 | 27.3 | 70.3 | 10− |

Table II.—Summary of physical properties of carbon blacks of Table 1 in standard rubber tests—Continued (30 Minutes Cure at 307° F.)

| Run No. | Compression Set, percent | 80 F. | | | 200 F. Maximum Tensile, p. s. i. | Δ TF | Resilience, percent | Flex Life, M. | Shore Hardness | Abrasion Loss, g. | Compounded MS 1½ 212 F. | Extrusion at 250 F. | | |
|---|---|---|---|---|---|---|---|---|---|---|---|---|---|---|
| | | 300 percent Modulus, p. s. i. | Tensile, p. s. i. | Elongation, percent | | | | | | | | in./min. | g./min. | Rating |

Choke 1½" from Inlet to Reaction Section

| 1 | | 2,210 | 3,250 | 400 | | 55.9 | 62.1 | 3.5 | 65 | 4.55 | | | | |
| 2 | | 2,500 | 3,320 | 385 | | 60.2 | 61.9 | 4.4 | 64.5 | 4.29 | | | | |
| 3 | | 2,360 | 3,230 | 360 | | 60.2 | 61.4 | 2.1 | 65 | 4.17 | | | | |

Choke at Inlet to Reaction Section

| 4 | | 2,450 | 3,560 | 390 | | 60.2 | 61.7 | 4.4 | 65.5 | 4.54 | | | | |

Straight Reactor Control

| 5 | | 2,040 | 3,780 | 450 | | 61.9 | 59.7 | 3.0 | 65.5 | 5.01 | | | | |

E Means estimated.

In Table III, runs Nos. 6 to 10 were made in a 4" diameter reaction section furnace with the same axial oil feedstock B169 of Table VI and with the 2½-inch internal diameter 9-inch long choke located at the end of precombustion chamber 21. There was no choke in the otherwise similar furnace in runs 11 and 12. The oil feedstocks of runs 11 and 12 were E1 and B184, respectively, and are equivalent in producing carbon black of the same rubber reinforcing properties to B169 (see Table VI).

and Shore hardness imparted by the blacks. Decreasing the reaction section length from 60 to 30 inches in runs 6 to 8 improved the abrasion resistance; decreasing to 15 inches in run 9 did not improve the abrasion resistance further. Of particular significance is the low heat buildup imparted by these carbon blacks. Blacks of runs 8 and 9 are 50 to 70 percent better than run 12 in laboratory abrasion resistance but give only slightly poorer heat buildup than run 12. The blacks with the choke impart approximately 15 percent lower heat buildup than those Table III.—Summary of physical properties evaluation of SAF type blacks from carbon black pilot plant (30 Minutes Cure at 307° F.)

| Run No. | Reaction Section Length, inches | Tangential | | Axial | | Yield, lb./gal. | 300 percent Modulus,[1] p. s. i. | Δ T F. | Resilience, percent | Shore Hardness | Abrasion Loss, g. | Compounded MS 1½ |
|---|---|---|---|---|---|---|---|---|---|---|---|---|
| | | Air Rate, M c. f. h. | Gas Rate, M c. f. h. | Oil Rate, gal./hr. | Air Rate, c. f. h. | | | | | | | |
| 6 | 60 | 18 | 1.2 | 24.1 | 540 | 3.16 | 1,085 | 66.2 | 56.6 | 56 | 8.31 | 37 |
| 7 | 45 | 18 | 1.2 | 21.7 | 540 | 2.87 | 1,175 | 67.6 | 55.8 | 58 | 6.92 | 38 |
| 8 | 30 | 18 | 1.2 | 19.8 | 540 | 2.52 | 1,175 | 68.6 | 54.1 | 59.5 | 6.57 | 42 |
| 9 | 15 | 18 | 1.2 | 15.4 | 540 | 1.83 | 1,310 | 66.9 | 55.2 | 60.5 | 6.66 | 45 |
| 10 | 60 | 23.4 | 1.56 | 30.1 | 540 | 2.87 | 1,215 | 66.6 | 56.2 | 58 | 7.24 | 39.5 |
| 11 | 60 | 24.2 | 1.5 | 29 | 1,400 | 2.6 | 980 | 76.0 | 52.4 | 57.5 | 8.17 | 40 |
| 12 | 60 | 23.4 | 1.56 | 28.5 | 540 | 2.8 | 1,030 | 71.6 | 53.4 | 57 | 7.25 | 39 |

Oven Aged 24 Hours at 212 F.

| 6 | | | | | | | 1,940 | 59.5 | 61.7 | 61 | 5.39 | |
| 7 | | | | | | | 2,190 | 60.8 | 61.2 | 62.5 | 4.39 | |
| 8 | | | | | | | 2,200 | 62.2 | 59.6 | 64. | 4.17 | |
| 9 | | | | | | | 2,250 | 59.5 | 59.8 | 64.5 | 4.16 | |
| 10 | | | | | | | 2,180 | 58.8 | 61.0 | 63 | 4.80 | |
| 11 | | | | | | | 1,850 | 65.2 | 59.0 | 64 | 4.81 | |
| 12 | | | | | | | 1,820 | 56.5 | 65.5 | 60 | 7.28 | |

[1] Original modulus values are averages of 20, 30, 45, 75 minute cures.

The oil charged to the furnace for the various runs therefore was an $SO_2$ extract oil having a BMCI of about 90. The oil preheat for all runs was about 750° F. The photolometer for all runs ranged between 88 and 92.

The milling observations (not shown) and processing data in Table III show all of the blacks made using a choke in the 4-inch reactor incorporated into the rubber easily. Decreasing the reaction section length in 15-inch increments from 60 to 15 inches increased the Mooney without the choke and except for run 6 are more reinforcing than any of these blacks. The high modulus of the blacks made with a choke and a shortened reaction section is also of interest.

To determine the effect that the length of the precombustion chamber had on the quality of the black produced in a choked furnace a number of tests were made, which are reported in Table IV. The size and location of the choke was the same as described for Table III.

It is evident that the carbon blacks made in the furnace with a 4¾-inch precombustion chamber length are the best blacks reported in Table IV. Runs 13 and 16 used uncooled oil tubes, while runs 14, 15, 17 and 18 used water cooled oil tubes (not shown) like those in Figure 7 of my copending application Serial No. 406,695, filed January 28, 1954, now abandoned. The shortened precombustion chamber length of 3¼ inches in runs 15 and 18 was simulated by projecting the oil tube 22 into the chamber 21.

Table V presents data illustrating the throughput studies made for a 60-inch and 30-inch reaction section in a 4-inch diameter reactor containing a 2½-inch (I. D.), 9-inch long choke, which was located at the inlet to the reaction section. The precombustion chamber had a length of 4¾ inches.

*Table IV.—Choke-precombustion chamber length study*

| Run No. | Precombustion chamber length, inches | Tang. Air Rate, M. c. f. h. | Oil Rate, g. p. h. | Yield lb./gal. | Nitrogen Surface area, M²/g. | Abrasion Index | 300% Modulus Index | Resilience Index | Heat build up Index | Mooney Viscosity Index |
|---|---|---|---|---|---|---|---|---|---|---|
| *30-inch Reaction Section Length* | | | | | | | | | | |
| 13 | 4¾ | 18 | 19.8 | 2.52 | 154.3 | 124.4 | 120.0 | 103.3 | 90.3 | 105 |
| 14 | 4¾ | 18 | 18.2 | 2.32 | 156.7 | 113.0 | 109.9 | 101.6 | 97.6 | 102.6 |
| 15 | 3¼ | 18 | 17.7 | 2.07 | 175.3 | 110.5 | 104.1 | 96.3 | 101.5 | 113.1 |
| *Oven Aged 24 Hours at 212 F.* | | | | | | | | | | |
| 13 | | | | | | 115.4 | 116.6 | 101.0 | 95.4 | |
| 14 | | | | | | 113.9 | 104.9 | 103.4 | 94.5 | |
| 15 | | | | | | 114.7 | 107.1 | 97.5 | 98.1 | |
| *15-inch Reaction Section Length* | | | | | | | | | | |
| 16 | 4¾ | 18 | 15.4 | 1.83 | 184.4 | 122.6 | 133.6 | 105.4 | 88.0 | 112.5 |
| 17 | 4¾ | 18 | 14.8 | 1.79 | ---- | 116.6 | 118.0 | 101.9 | 95.4 | 118.5 |
| 18 | 3¼ | 18 | 12.4 | 1.25 | 236.1 | 108.6 | 115.0 | 98.6 | 97.7 | 131.6 |
| *Oven Aged 24 Hours at 212 F.* | | | | | | | | | | |
| 16 | | | | | | 115.6 | 118.6 | 101.4 | 91.4 | |
| 17 | | | | | | 119.6 | 111.5 | 100.5 | 94.1 | |
| 18 | | | | | | 114.5 | 119.5 | 99.5 | 97.1 | |

*Table V.—Choke-throughput studies*

| Run No. | Precombustion chamber length, inches | Tang. Air Rate, M. c. f. h. | Oil Rate, g. p. h. | Yield lb./gal. | Nitrogen Surface area, M²/g. | Abrasion Index | 300% Modulus Index | Resilience Index | Heat build up Index | Mooney Viscosity Index |
|---|---|---|---|---|---|---|---|---|---|---|
| *60-inch Reaction Section Length* | | | | | | | | | | |
| 19 | 4¾ | 18 | 24.1 | 3.16 | 108.4 | 98.4 | 110.7 | 108.0 | 87.1 | 92.5 |
| 20 | 4¾ | 23.4 | 30.1 | 2.87 | 133.6 | 112.8 | 124.0 | 107.3 | 87.6 | 98.8 |
| 21 | 4¾ | 23.4 | 30.1 | 2.87 | 133.6 | 102.2 | 116.5 | 106.6 | 89.7 | 92.8 |
| 22 | 4¾ | 30 | 37.3 | 3.22 | 129 | 102.9 | 119.1 | 106.9 | 92.5 | 92.8 |
| 23 | 4¾ | 36 | 42.5 | 2.95 | 134.7 | 103.1 | 105.7 | 105.4 | 92.1 | 96.1 |
| *Oven Aged 24 Hours at 212 F.* | | | | | | | | | | |
| 19 | | | | | | 89.3 | 100.0 | 104.6 | 91.2 | |
| 20 | | | | | | 100.2 | 115.4 | 103.4 | 89.7 | |
| 21 | | | | | | 104.2 | 108.6 | 104.6 | 90.1 | |
| 22 | | | | | | 102.6 | 111.1 | 105.8 | 90.1 | |
| 23 | | | | | | 101.9 | 101.9 | 105.1 | 91.6 | |
| *30-inch Reaction Section Length* | | | | | | | | | | |
| 24 | 4¾ | 18 | 19.6 | 2.58 | ---- | 114.4 | 111.9 | 101.4 | 98.7 | 105.3 |
| 25 | 4¾ | 30 | 30.1 | 2.40 | 166.6 | 108.6 | 113.0 | 103.0 | 95.4 | 102.6 |
| 26 | 4¾ | 36 | 35.8 | 2.11 | 184 | 109.0 | 101.6 | 100.0 | 98.2 | 110.6 |
| *Oven Aged 24 Hours at 212 F.* | | | | | | | | | | |
| 24 | | | | | | 115.4 | 109.0 | 102.8 | 94.5 | |
| 25 | | | | | | 111.1 | 110.2 | 104.1 | 93.5 | |
| 26 | | | | | | 114.5 | 112.1 | 101.3 | 95.6 | |

It became of interest to determine if it was critical that the choke be located exactly at the end of first chamber 21 or if it could be moved downstream in second chamber 37, and if so, how far. Experiments tabulated in Table VII indicate that this distance is critical, and may be optimum with shoulder 40 being 1.5 to 3 inches long, but not over 6 inches long. Table VI gives the properties of the feedstocks used in the other tables. The properties of the standard rubber samples containing carbon black of the runs of Table VII are given in Table VIII.

*Table VI.—Properties of feedstocks*

| Feedstock No | B169 | B184 | B196 | B201 | B202 | B206 | B207 | E1 |
|---|---|---|---|---|---|---|---|---|
| Aniline Point | 26.8 | 52.9 | 77.7 | 69.1 | 85.6 | 78.4 | 72.30 | |
| Gravity, API | 13.7 | 13.3 | 12.0 | 12.8 | 13.9 | 12.8 | 12.3 | 10.4 |
| ASTM Distillation (F. at 760 mm.): | | | | | | | | |
| First Drop | 472 | 504 | 460 | 519 | 406 | 522 | 449 | 476 |
| 5% | 493 | 531 | 569 | 543 | 505 | 566 | 497 | 500 |
| 10% | 500 | 542 | 584 | 559 | 535 | 570 | 521 | 512 |
| 20% | 513 | 553 | 595 | 574 | 580 | 590 | 574 | 530 |
| 30% | 534 | 565 | 607 | 588 | 600 | 603 | 600 | 542 |
| 40% | 544 | 577 | 618 | 599 | 626 | 615 | 609 | 558 |
| 50% | 561 | 588 | 627 | 613 | 640 | 629 | 634 | 574 |
| 60% | 577 | 604 | 643 | 628 | 656 | 642 | 652 | 596 |
| 70% | 609 | 625 | 654 | 637 | 677 | 657 | 672 | 618 |
| 80% | 644 | 649 | 682 | 673 | 709 | 679 | 705 | 664 |
| 90% | 699 | 692 | 718 | 717 | 771 | 700 | 761 | 708 |
| 95% | 731 | 737 | 751 | 769 | | 744 | [1] 772 | |
| End Point | 736 | 757 | 771 | none | | 768 | none | 724 |
| Pour Point, F | −10 | −9 | 30 | 36 | 50.0 | | 35 | |
| Viscosity, SUS at 100 F | 44.9 | 47.6 | 60.7 | 53.76 | 65.46 | 57.3 | 60.67 | |
| Viscosity, SUS at 210 F | 31.6 | 32.1 | 33.9 | 33.11 | 34.76 | 33.6 | 33.94 | |
| Ramsbottom Carbon Resi | 1.2 | 2.6 | 1.9 | 2.7 | 3.78 | 2.6 | 4.31 | |
| Bureau of Mines Correlation Index | 90.5 | 89.6 | 90.5 | 84.2 | 83.7 | 88.2 | 89.4 | 99.4 |
| Carbon Content, Wt. Percent | 89.1 | 89.2 | 89.8 | 89.6 | 88.6 | 89.9 | 89.1 | |
| Hydrogen Content, Wt. Percent | 9.9 | 9.8 | 9.2 | 9.6 | 10.4 | 9.1 | 10.0 | |
| Sulfur Content, Wt. Percent | 1.0 | 0.9 | 1.0 | 1.0 | 0.95 | 1.0 | 1.03 | |
| Refractive Index, 20/D | | | | | 1.5710 | | 1.5781 | |
| Percent Rec | | | | | | | | 95 |

[1] 92% at 772° F.

*Table VII.—Summary of choke position study with 4-inch SAF reactor*

[2.5-Inch (I. D.) by 9-Inch (Long) Choke.]

| Run No. | Choke Position[1] | Reaction Section Length, inches | Tangential Air Rate, M c.f.h. | Oil Rate, g.p.h. | Oil Number | Carbon Yield, lb./gal. | Air-Oil Ratio, cf./gal. | Nitrogen Surface Area, m²/g. | Abrasion Index | 300% Modulus[2] Index | Resilience Index[3] |
|---|---|---|---|---|---|---|---|---|---|---|---|
| *Series I* | | | | | | | | | | | |
| 27 | flush | 30 | 18 | 19.6 | B169 | 2.58 | 946 | 154.3 | 114.9 | 108 | 102 |
| 28 | 1.5 | 30 | 18 | 20.0 | B206 | 2.99 | 927 | 150.9 | 122.5 | 124 | 104.5 |
| 29 | 3 | 30 | 18 | 19.9 | B206 | 2.93 | 932 | 141.4 | 117.9 | 116 | 103.1 |
| *Series II* | | | | | | | | | | | |
| 30 | flush | 60 | 18 | 24.1 | B169 | 3.16 | 769 | 108.4 | 93.7 | 110.4 | 105.2 |
| 31 | 1.5 | 60 | 18 | 23.7 | B206 | 3.37 | 782 | 114.5 | 91 | 114.5 | 105.7 |
| 32 | 3 | 60 | 18 | 22.9 | B206 | 3.31 | 809 | 116.1 | 83.5 | 110 | 105 |
| *Series III* | | | | | | | | | | | |
| 33 | flush | 30 | 36 | 35.8 | B196 | 2.15 | 1035 | 184 | 111.7 | 104.5 | 100.5 |
| 34 | 1.5 | 30 | 36 | 33.8 | B206 | 2.23 | 1097 | 190.3 | 122.1 | 119.8 | 104.8 |
| 35 | 3 | 30 | 36 | | | | | | | | |
| *Series IV* | | | | | | | | | | | |
| 36 | flush | 60 | 36 | 42.5 | B196 | 2.95 | 872 | 134.7 | 102.5 | 104 | 105 |
| 37 | 1.5 | 60 | 36 | 41.5 | B206 | 2.93 | 893 | 139 | 112.2 | 117 | 105.8 |
| 38 | 3 | 60 | 36 | 43.6 | B206 | 3.41 | 850 | 114 | 92.5 | 109.8 | 108.5 |

[1] Choke position reference point is the downstream wall of the precombustion chamber. Numbers represent inches downstream.
[2] Indexes are based upon Run No. 11, Table III, as 100. These values are the average for original and aged 30 minute cure specimens.

Table VIII.—Summary of physical properties of rubber containing carbon black of Table VII (30 Minutes Cure Time at 307 F.)

| Run No. | 80 F. | | | 200 F. | | ΔT F. | Resilience, Percent | Shore Hardness | Abrasion Loss, g. | Compounded MS 1½ |
|---|---|---|---|---|---|---|---|---|---|---|
| | 300% Modulus, p.s.i. | Tensile, p.s.i. | Elongation, Percent | Tensile, p.s.i. | Elongation, Percent | | | | | |
| 27 | 1,090 | 3,730 | 600 | 1,360 | 360 | 70.6 | 54.9 | 57.5 | 6.74 | 40.0 |
| 28 | 1,320 | 3,475 | 540 | 1,260 | 320 | 69.9 | 57.7 | 57.5 | 5.53 | 35.0 |
| 29 | 1,180 | 3,670 | 600 | 1,280 | 390 | 69.9 | 57.3 | 59 | 5.83 | 36.5 |
| 30 | 1,090 | 3,440 | 590 | 1,280 | 340 | 66.2 | 56.6 | 56 | 8.31 | 37.0 |
| 31 | 1,200 | 3,300 | 550 | 1,450 | 380 | 68.3 | 58.3 | 58 | 6.56 | 33.0 |
| 32 | 1,160 | 2,980 | 540 | 1,100 | 350 | 73.3 | 58.5 | 57.5 | 7.35 | 35.0 |

Oven Aged 24 Hours at 212 F.

| Run No. | 300% Modulus, p.s.i. | Tensile, p.s.i. | Elongation, Percent | Tensile, p.s.i. | Elongation, Percent | ΔT F. | Resilience, Percent | Shore Hardness | Abrasion Loss, g. | Compounded MS 1½ |
|---|---|---|---|---|---|---|---|---|---|---|
| 27 | 1,860 | 3,780 | 470 | | | 63.5 | 60.6 | 63.5 | 5.32 | |
| 28 | 2,370 | 3,240 | 380 | | | 61.9 | 63.7 | 64 | 3.60 | |
| 29 | 2,330 | 3,580 | 400 | | | 62.2 | 62.5 | 64 | 3.68 | |
| 30 | 1,940 | 3,620 | 440 | | | 59.5 | 61.7 | 61 | 5.39 | |
| 31 | 2,220 | 3,360 | 390 | | | 61.9 | 64.4 | 63 | 4.46 | |

(30 Min. Cure Time @ 307 F.)

| Run No. | 300% Modulus, p.s.i. | Tensile, p.s.i. | Elongation, Percent | Tensile, p.s.i. | Elongation, Percent | ΔT F. | Resilience, Percent | Shore Hardness | Abrasion Loss, g. | Compounded MS 1½ |
|---|---|---|---|---|---|---|---|---|---|---|
| 32 | 2,120 | 2,820 | 360 | | | 61.9 | 63.4 | 63.5 | 4.70 | |
| 33 | 1,020 | 4,050 | 620 | 1,390 | 310 | 70.3 | 54.2 | 58.5 | 7.09 | 42.0 |
| 34 | 1,225 | 3,720 | 570 | 1,220 | 395 | 67.9 | 57.8 | 59.5 | 5.60 | 40.0 |
| 35 | | | | | | | | | | |
| 36 | 1,070 | E 3,750 | E 650 | 1,300 | 330 | 65.9 | 57.1 | 55.5 | 7.47 | 36.5 |
| 37 | 1,220 | 3,560 | 550 | 1,250 | 380 | 68.6 | 58.9 | 56.5 | 5.92 | 34.0 |
| 38 | 1,130 | 3,210 | 590 | 1,220 | 390 | 70.3 | 59.4 | 59.5 | 7.40 | 33.0 |

Oven Aged 24 hours at 212 F.

| Run No. | 300% Modulus, p.s.i. | Tensile, p.s.i. | Elongation, Percent | Tensile, p.s.i. | Elongation, Percent | ΔT F. | Resilience, Percent | Shore Hardness | Abrasion Loss, g. | Compounded MS 1½ |
|---|---|---|---|---|---|---|---|---|---|---|
| 33 | 1,860 | 3,925 | 465 | | | 64.2 | 59.7 | 63 | 5.36 | |
| 34 | 2,380 | 3,470 | 380 | | | 60.5 | 64.1 | 64.5 | 3.58 | |
| 35 | | | | | | 61.5 | 62.0 | 61.5 | 6.03 | |
| 36 | 1,750 | 3,550 | 470 | | | 61.2 | 64.1 | 62.5 | 3.94 | |
| 37 | 2,275 | 3,575 | 400 | | | 61.9 | 66.8 | 61.5 | 4.72 | |
| 38 | 2,170 | 3,260 | 395 | | | | | | | |

E means estimated.

In the furnaces of Tables IX and XI the precombustion chamber 21 was 35 or 37 inches in diameter as indicated in note 3 below Table IX and 12 inches long, the reaction chamber 37 was 12 inches in diameter and of the length indicated, and the choke was 9 inches long and 8 inches internal diameter as indicated, except as noted differently in the tables. In run No. 40 a multiple port oil nozzle (not shown) like that in Figures 5 and 6 of my copending application Serial No. 406,695, filed January 28, 1954, was employed. Table X gives the properties of standard rubber samples containing carbon black from the runs of Table IX, and Table XII those of Table XI.

Table IX.—Pilot plant operating data

| Run No. | BMCI | Oil Rate, gal./hr. | Oil Preheat, °F. | Tangential Air Rate, M c.f.h. | Tangential Gas Rate, M c.f.h. | Jacket Air Rate, M c.f.h. | Water In Oil, gal./hr. | Photometer | Pilot Plant Yield, lb./gal. | Nitrogen Surface Area, sq. m./g. | 12-inch Reactor with Choke[3] | Precombustion Chamber Length,[4] in. | Reaction Section Length, ft. |
|---|---|---|---|---|---|---|---|---|---|---|---|---|---|
| 39 | 83.7 | 182.5 | 765 | 140 | 9.33 | 4 | | 89 | 3.45 | 105.0 | #1 | 12 | 5 |
| 40 | 92.2 | 201.2 | 720 | 160 | 10.66 | 4 | | 91 | 3.47 | 106.9 | no choke | 9 | 5 |
| 41 | 83.7 | 170.8 | 765 | 140 | 9.33 | 4 | | 91 | 2.95 | 121.7 | #1 | 7.5 | 5 |
| 42 | 83.7 | 157.3 | 750 | 140 | 9.33 | 4 | | 91 | 2.54 | 133.3 | #2 | 7.5 | 5 |
| 43[1] | 83.7 | 162.0 | 770 | 140 | 9.33 | 4 | | 91 | 2.45 | 127.2 | #1 | 7.5 | 5 |
| 44[1] | 83.7 | 162.9 | 765 | 140 | 9.33 | 4 | | 90 | 2.47 | 126.1 | #1 | 7.5 | 5 |
| 45 | 83.7 | 159.6 | 750 | 140 | 9.33 | 4 | 28.5 | 90 | 2.41 | 130.4 | #1 | 9 | 5 |
| 46 | 83.7 | 160.0 | 760 | 140 | 9.33 | 4 | 18.5 | 90 | 2.39 | 129.5 | #1 | 7.5 | 5 |
| 47 | 83.7 | 157.8 | 765 | 140 | 9.33 | 4 | | 90 | 2.55 | 138.2 | #1 | 7.5 | 4 |
| 48 | 83.7 | 112.0 | 760 | 100 | 6.66 | 4 | | 90 | 2.40 | 142.3 | #1 | 6 | 3 |
| 49 | 83.7 | 165.0 | 760 | 140 | 9.33 | 4 | | 88 | 2.64 | 126.5 | #1 | 6 | 5 |
| 50 | 83.7 | 208.0 | 765 | 185 | 12.33 | 4 | | 90 | 2.34 | 141.7 | #1 | 6 | 5 |
| 51[2] | 89.3 | 28.8 | 760 | 23.04 | 1.56 | 1.4 | | 90 | 3.00 | 139.7 | | 4.75 | 5 |

[1] Small oil tube (½-inch) used. In other runs with 12-inch reactor 1-inch oil tube was used (except Run 40 which used a multiple-port nozzle).
[2] 4-inch reactor control run.
[3] 12-inch #1 reactor had 35-inch precombustion chamber and 10-inch tangential tunnels with 8-inch I. D. choke 9 inches long located at reaction section inlet. 12-inch #2 reactor had 37-inch precombustion chamber and 12-inch tangential tunnels with 8-inch I. D. choke 9 inches long located at reaction section inlet.
[4] Precombustion chamber lengths less than 12 inches in 12-inch reactors obtained by projecting oil tube into precombustion chamber.

Table X.—Summary of physical properties, rubber containing carbon black of Table IX.

(30 Minutes Cure Time at 307 F.)

| Run No. | 80 F. | | | Average Modulus | 200 F. Maximum Tensile, p. s. i. | Δ T F. | Resilience, Percent | Flex Life, M | Shore Hardness | Abrasion Loss, g. | Compounded MS 1½, 212 F. |
|---|---|---|---|---|---|---|---|---|---|---|---|
| | 300 Modulus, p. s. i. | Tensile, p. s. i. | Elongation, Percent | | | | | | | | |
| 39 | 1,270 | 3,200 | 540 | 1,270 | 1,260 | 60.5 | 61.6 | 6.9 | 56.5 | 7.24 | 33 |
| 40 | 1,250 | 3,310 | 550 | 1,300 | 1,230 | 63.5 | 59.2 | 7.2 | 57 | 7.03 | 34 |
| 41 | 1,390 | 3,620 | 560 | 1,370 | 1,150 | 62.5 | 57.1 | 4.3 | 58.5 | 6.68 | 36 |
| 42 | 1,290 | 3,300 | 535 | 1,240 | 1,190 | 64.2 | 56.3 | 7.4 | 58.5 | 6.84 | 38 |
| 43 | 1,220 | 3,460 | 570 | 1,260 | 1,300 | 63.5 | 55.8 | 4.4 | 59 | 6.84 | 36.5 |
| 44 | 1,260 | 3,650 | 570 | 1,240 | 1,150 | 63.5 | 55.7 | 5.4 | 58.5 | 7.00 | 36 |
| 45 | 1,325 | 3,450 | 560 | 1,270 | 1,280 | 63.5 | 54.4 | 4.9 | 58.5 | 6.84 | 38 |
| 46 | 1,250 | 3,475 | 555 | 1,260 | 1,200 | 64.5 | 54.3 | 4.0 | 59.5 | 6.76 | 36.5 |
| 47 | 1,375 | 3,460 | 540 | 1,280 | 1,350 | 63.8 | 56.5 | 4.5 | 60 | 6.36 | 38 |
| 48 | 1,250 | E 3,550 | E 570 | 1,250 | 1,190 | 63.8 | 55.2 | 5.3 | 60.5 | 6.73 | 39 |
| 49 | 1,270 | 3,500 | 555 | 1,250 | 1,250 | 61.5 | 56.9 | 7.4 | 59 | 7.18 | 36.5 |
| 50 | 1,120 | 3,275 | 555 | 1,140 | 1,130 | 64.5 | 54.6 | 4.0 | 60 | 6.65 | 39.5 |
| 51 | 1,225 | 3,550 | 585 | 1,230 | 1,290 | 65.5 | 54.5 | 4.8 | 60 | 6.86 | 39 |

E in Run 48 means estimated.

Table XI.—Pilot plant operating data—regular 12-inch Philblack reactor

| Run No. | Oil Rate, gal./hr. | Oil Preheat, F. | Tangential | | Jacket Air Rate, M. c. f. h. | Photelometer | Pilot Plant Yield, lb./gal. | Nitrogen Surface Area, sq./m./g. | Precom. Chamber Length [1] inches | Reaction Section Length inches |
|---|---|---|---|---|---|---|---|---|---|---|
| | | | Air Rate, M. c. f. h. | Gas Rate, M. c. f. h. | | | | | | |
| 12-Inch Reactor With 12-Inch Tangential Tunnels, No Choke | | | | | | | | | | |
| 52 | 271.8 | 760 | 290 | 19.33 | 4 | 90 | 2.60 | 144.4 | 9 | 60 |
| 12-Inch Reactor With 10-Inch Tangential Tunnels, No Choke | | | | | | | | | | |
| 53 | 273 | 775 | 290 | 19.33 | 4 | 90 | 2.60 | 144.9 | 9 | 60 |
| 12-Inch Philblack Reactor with Choke and 12-Inch Tunnels (8-inch choke 9 inches long at inlet of reaction section) | | | | | | | | | | |
| 54 | 218.5 | 745 | 185 | 12.33 | 4 | 90 | 2.96 | 124.5 | 12 | 60 |
| 55 | 210.1 | 760 | 185 | 12.33 | 4 | 91 | 2.67 | 137.0 | 9 | 60 |
| 56 | 204.0 | 760 | 185 | 12.33 | 4 | 89 | 2.34 | 146.0 | 7.5 | 60 |
| 57 | 195.5 | 765 | 185 | 12.33 | 4 | 90 | 2.12 | 151.7 | 6 | 60 |
| 58 | 157.3 | 750 | 140 | 9.33 | 4 | 91 | 2.54 | 133.3 | 7.5 | 60 |
| 59 | 154.8 | 750 | 140 | 9.33 | 4 | 90 | 2.33 | 135.8 | 6 | 60 |

[1] Precombustion section lengths less than 12 inches obtained by projecting oil tube into precombustion section. The oil feedstock Number in Runs Nos. 52 and 53 was B-207 and in Runs Nos. 54 to 59 was B-202, see Table VI for analysis.

Table XII.—Summary of physical properties of rubber containing carbon black of Table XI

| Run No. | 80 F. | | | 200 F. Maximum Tensile, p. s. i. | Δ T. F. | Resilience, percent | Flex Life, M | Shore Hardness | Abrasion Loss, g. | Compounded MS 1½, 212 F. |
|---|---|---|---|---|---|---|---|---|---|---|
| | 300 Percent Modulus p. s. i. | Tensile, p. s. i. | Elongation, percent | | | | | | | |
| 52 | 1,050 | E 3,700 | E 650 | 1,275 | 68.6 | 55.8 | 5.0 | 57.5 | 7.35 | 40 |
| 53 | 940 | 3,725 | 650 | 1,300 | 66.2 | 56.4 | 5.1 | 58.5 | 7.21 | 38 |
| 54 | 1,030 | 3,500 | 605 | 1,420 | 66.9 | 58.8 | 6.5 | 56.5 | 7.26 | 37 |
| 55 | 1,080 | 3,580 | 610 | 1,375 | 67.9 | 56.8 | 4.8 | 57.5 | 7.16 | 40 |
| 56 | 975 | 3,670 | 630 | 1,400 | 68.9 | 55.4 | 5.0 | 59 | 7.16 | 38 |
| 57 | 1,080 | E 3,500 | E 610 | 1,580 | 71.6 | 54.8 | 4.1 | 60 | 7.47 | 40 |
| 58 | 1,060 | 3,450 | 600 | 1,225 | 67.9 | 57.8 | 7.2 | 58 | 7.05 | 35.5 |
| 59 | 1,070 | 3,470 | 600 | 1,475 | 68.9 | 56.2 | 6.8 | 58.5 | 7.27 | 37.5 |

E is estimated.

It should be noted in Table IX that runs have been made in the 12-inch diameter reactor section of the lengths 3, 4 and 5 feet. The best run was No. 47 with the 4-foot long reactor section, but the 3- and 5-foot lengths also produced superior carbon blacks. In the 4-inch diameter reaction section the 30-inch long reactor gave the most reinforcing blacks in run No. 8 of Table III but the 15-, 30- and 45-inch lengths also gave superior carbon blacks.

It should be noted in Tables X and XI that the advantage of the choke is clearly shown. Run No. 52 is the best run without a choke (run No. 53 being considered poor due to poor furnace operability). The best run with a choke in the 12-inch tunnel furnace of these tables is run No. 58, which gave higher yield allowing for the difference in BMCI of the oil feed, a more favorable air-oil ratio which reduces the size of the gas-solids separation zone 69 required, better hysteresis and abrasion resistance qualities, and has a lower air pressure requirement.

The best run with a choked reactor with 10-inch tunnels is run No. 47, Table IX, and is superior to run No. 52, Table XI, in modulus and abrasion resistance when both runs are compared to run No. 42 of Table X.

Runs made in comparison with runs Nos. 57 to 59 of Table XII but with the choke moved 3-inches downstream of the inlet of the reaction section show a definite reduction in abrasion loss of the standard rubber samples, increased resilience, and greater extrusion rates. Data can be supplied, if necessary, as there is much more data available, but it is believed not desirable to lengthen the specification any further.

While certain processes, specific apparatus, and specific examples have been given for illustrative purposes, the invention obviously is not limited thereto.

Having described my invention, I claim:

1. A process for producing carbon black which comprises introducing a vaporous hydrocarbon into a generally cylindrical first zone having a diameter greater than its length, said introduction being along the axis of said first zone, establishing a rotating mass of hot combustion gases surrounding said vaporous hydrocarbon in said first zone by continuously injecting tangentially thereinto free oxygen containing gases and fuel, supporting combustion thereby, and continuously injecting the resulting hot combustion gases into said rotating mass in said first zone, continuously passing said vaporous hydrocarbons surrounded by said rotating hot combustion gases axially into a generally cylindrical second zone the length of which is greater than its diameter and the diameter of which is less than ¾ that of said first zone through a choke 4.5 to 18 inches long disposed in, and within 6 inches of the inlet end of, and having from 40 to 85% the diameter of, said second zone, said second zone being in communication with and in axial alignment with said first zone, forming carbon black from said vaporous hydrocarbon by pyro-chemical action due to the heat of the surrounding hot combustion gases without the further addition of any substantial amount of free oxygen containing gases downstream of said choke, quenching the effluent from said second zone with a water quench as it leaves the same, and separating said carbon black from the resultant gaseous products of said process.

2. A process for producing carbon black which comprises introducing a vaporous hydrocarbon into a generally cylindrical first zone having a diameter greater than its length, said introduction being along the axis of said first zone, establishing a rotating mass of hot combustion gases surrounding said vaporous hydrocarbon in said first zone by injecting tangentially thereinto free oxygen containing gases and fuel, supporting combustion thereby, and continuously injecting the resulting hot combustion gases into said rotating mass in said first zone, continuously passing said vaporous hydrocarbons surrounded by said rotating combustion gases axially into a generally cylindrical second zone the length of which is greater than its diameter and the diameter of which is less than ¾ that of said first zone through a choke 4.5 to 18 inches long disposed in, and within six inches of the inlet end of, and having from 40 to 85% the diameter of, said second zone, said second zone being in communication through said choke with and in axial alignment with said first zone, forming carbon black from said vaporous hydrocarbon by pyro-chemical action due to the heat of the surrounding hot combustion gases without the further addition of any substantial amount of free oxygen containing gases downstream of said choke, and separating said carbon black from the resultant gaseous products of said process.

3. A carbon black furnace comprising a refractory lined heat insulated body having a generally cylindrical bore, said bore comprising a generally cylindrical first chamber having a diameter greater than its length, means to introduce hydrocarbon feed generally axially of said first chamber, means to introduce free oxygen containing gases and fuel thereinto generally tangentially to the inner surface of said first chamber, said first chamber being connected to discharge into a second generally cylindrical chamber the length of which is greater than its diameter and the diameter of which is less than ¾ that of said first chamber, and a refractory choke 4.5 to 18 inches long disposed in, and within six inches of the inlet end of, and having from 40 to 85% the diameter of, said second chamber, said first and second chambers being axially aligned and communicating with each other, said second chamber being imperforate and having a single axial inlet and a single axial outlet, a discharge conduit forming a substantial continuation in communication with said second chamber, and water spray quench means at the downstream end of said second chamber.

4. A carbon black furnace comprising a refractory lined heat insulated body having a generally cylindrical bore, said bore comprising a generally cylindrical first chamber having a diameter greater than its length, means to introduce hydrocarbon feed generally axially of said first chamber, means to introduce free oxygen containing gases and fuel thereinto generally tangentially to the inner surface of said first chamber, said first chamber being connected to discharge into a second generally cylindrical chamber the length of which is greater than its diameter and the diameter of which is less than ¾ that of said first chamber, and a refractory choke 4.5 to 18 inches long disposed in, and within six inches of the inlet end of, and having from 40 to 85% the diameter of, said second chamber, said first and second chambers being axially aligned and communicating with each other said second chamber being imperforate and having a single axial inlet and a single axial outlet.

5. The process of claim 1 in which the choke is a cylindrical choke with square shoulders and the first zone has a diameter of 2 to 6 times and a length of ½ to 2 times the diameter of said second zone.

6. The process of claim 2 in which the choke is a cylindrical choke with square shoulders and the first zone has a diameter of 2 to 6 times and a length of ½ to 2 times the diameter of said second zone.

7. The apparatus of claim 3 in which the choke is a cylindrical choke with square shoulders and the first chamber has a diameter of 2 to 6 times and a length of ½ to 2 times the diameter of said second chamber.

8. The apparatus of claim 4 in which the choke is a cylindrical choke with square shoulders and the first chamber has a diameter of 2 to 6 times and a length of ½ to 2 times the diameter of said second chamber.

References Cited in the file of this patent

UNITED STATES PATENTS

| | | |
|---|---|---|
| 2,375,795 | Krejci | May 15, 1945 |
| 2,564,700 | Krejci | Aug. 21, 1951 |
| 2,616,795 | Krejci | Nov. 4, 1952 |
| 2,625,466 | Williams | Jan. 13, 1953 |
| 2,769,692 | Heller | Nov. 6, 1956 |